March 17, 1970 R. SIEFERT 3,501,655
SPEED CONTROLLED CLOCK MOTOR
Filed Feb. 5, 1968 4 Sheets-Sheet 1

March 17, 1970 R. SIEFERT 3,501,655
SPEED CONTROLLED CLOCK MOTOR
Filed Feb. 5, 1968 4 Sheets-Sheet 2

March 17, 1970 R. SIEFERT 3,501,655
SPEED CONTROLLED CLOCK MOTOR
Filed Feb. 5, 1968 4 Sheets-Sheet 4

3,501,655
SPEED CONTROLLED CLOCK MOTOR
Roland Siefert, Bad Durrheim, Germany, assignor to Kienzle Uhrenfabriken G.m.b.H., Schwenningen am Neckar, Germany, a corporation of Germany
Filed Feb. 5, 1968, Ser. No. 702,902
Claims priority, application Germany, Feb. 3, 1967,
K 61,341
Int. Cl. H02k 33/18
U.S. Cl. 310—38          9 Claims

ABSTRACT OF THE DISCLOSURE

This is an electrically powered clock motor having two rotor halves turnable relative to each other and connected together by a resilient member so that there can be relative timed oscillation of the two halves during rotation of the two. Drive and disturbing or oscillation producing impulses are applied to the rotor as a whole by stator coils so located relative to the rotor halves that the two kinds of impulses are spacially out of phase, the impulse being triggered by a pickup inductor coil.

BACKGROUND OF THE INVENTION

Field of the invention

The invention concerns electrically driven clock motors having relatively oscillatory split rotors for controlling speed.

Description of the prior art

There have been proposed standard frequency motors made up of two rotor halves connected to each other by an elastic torsion rod or bar for relative turning. Each of the rotor halves is made up of a number of permanent magnet poles and each of the rotor halves cooperates with a soft iron stator, one stator carrying the control coil system and the other the drive coil. The two coil systems are connected together over an electronic switch. Upon the turning of the rotors, owing to the turning of one rotor half, control voltages are induced in the control coils which, when amplified by the electronic switch, produce current impulses in the other coils to drive the other rotor. One rotor half then becomes driven while electromagnetic restraining forces interact between the other rotor half and the stator. The drive moment on the one rotor half and the disturbing moment on the other rotor half produce a torsional oscillation between the two rotor halves. Such a device is known in German Patent 1,149,437.

This known torsional vibration motor has many drawbacks. From a technical standpoint, it is extraordinarily difficult to mount the torsion bar in the two rotor halves without eccentricity or looseness. But such a mounting is unconditionally necessary for the requisite timekeeping properties. Moreover in the construction, timekeeping accuracy is dependent to a great extent on temperature owing to variations of magnetic properties of the rotor.

There is also the drawback of wabbling owing to the extraordinary bending of the thin torsion shaft. Also owing to ther elative great masses of the rotors and the thinness of the shaft the combination is quite sensitive to vibration and shock. Furthermore two stators must be justified relative to the rotor halves. Moreover the system can run at a speed corresponding to a harmonic of resonant frequency. Besides all this the motor is not self-starting.

SUMMARY OF THE INVENTION

This is a motor speed-stabilized relative to a normal frequency and is made up of two relatively turnable magnetic rotor halves provided with magnetic poles, the rotor halves being connected to each other through a resilient member. In this device the drive results from a current coil and at least one rotor half cooperates with a control coil of an electronic switch. The novel features are that the coils are air coils and periodic current impulses act simultaneously on both rotor halves during which upon the occurrence of an impulse current, the magnet poles of one rotor half simultaneously project over the control and current coils and the poles of the other rotor half are displaced from the current coil by an angle $\alpha$.

In a further development the device is so made that upon the occurrence of an impulse current, the poles of the one rotor half are situated opposite the control coils and are situated displaced from the work coils by the angle $\alpha$ while the poles of the other rotor half are situated opposite the current coils.

Under the action of the current impulses which are set up by the induced voltage in the control coil acting on the electronic switch, one rotor half is driven, while the similar current impulses exert disturbing moments on the other rotor half which excite a relative torsional oscillation between the two halves. These disturbing moments thus electromagnetically produced act only a short time and at the correct instant. Hence the efficiency of the system is remarkably high. Besides, the system attains its resonant frequency extraordinarily quickly from the start and continues. The system can be made self starting if a resistance-capacitance element is provided for the electronic switch. Owing to the system being out of phase by the angle $\alpha$, the motor can be made to start in only one direction by proper adjustment of the angle.

The two rotor halves are connected to each other by means of a coiled spring greatly reducing the difficulty of mounting the spring and the attendant inaccuracy of the timepiece. This connection enables the use of a non-bending arbor for the rotors so that the motor can be used in all positions.

Figure 1:
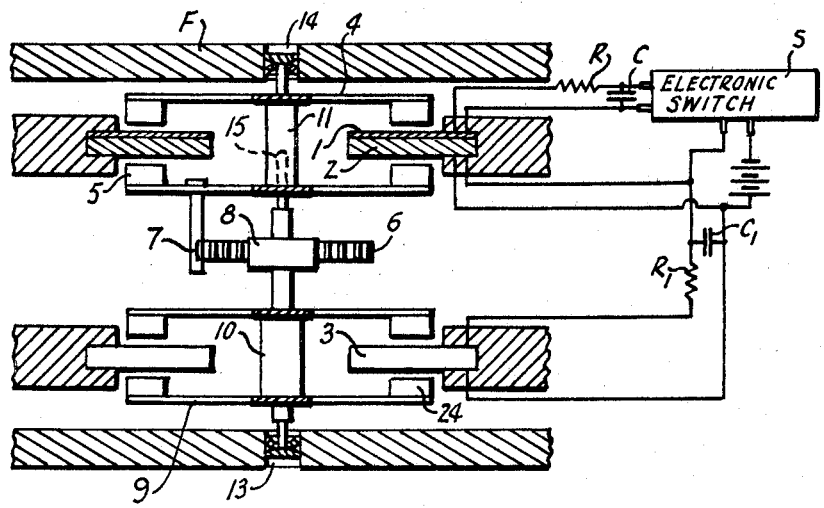
FIG. 1 shows the system in schematic side view with two rotor halves arranged one above the other.

According to FIG. 1 the motor consists of two four armed rotor halves 4 and 9. The arbor 10 of the rotor half 9 is bearingly mounted on a clock frame F by means of a pivot bearing 13 and in the bearing bore 15 in the arbor 11 carrying the rotor half 4, the latter being mounted at 14 on the frame of the clockwork. The two rotor halves are connected to each other through a spiral spring 6 having its inner end 8 secured to the arbor 10 and its outer end 7 to the rotor half 4, so that each half may turn with respect to the other but relative turning is influenced by the action of the spiral spring.

The rotor half 4 carries permanent magnets 5 which turn opposite and past stator inductor air coils 1 and 2, the former being pick-up or control coils and the latter current coils connected to an electronic switch S. Upon turning of the rotors a voltage is induced by magnets 5 in coil 1 which enables a current flow in coils 2 and 3.

Normally the poles 5 of one rotor half register with the magnets 24 of the other half.

The fixed current coils 3, axially displaced from coils 1 and 2 by an angle α, cooperate with the permanent magnets 24 on rotor half 9. Since during current flow through the coils 2 and 3 the magnets 24 are situated from the coil 3 by an angular distance α, a disturbing moment is exerted upon the rotor half 9, and the system comprising the masses of the two half rotors and the restoring force of the connecting spring 6 is set in relative axial oscillation. During this oscillation at the time of the current flow, the coils 3 effect a disturbing moment and at the same time current passed through the coils 2 produces a drive moment on the rotor half 4.

Figure 7:
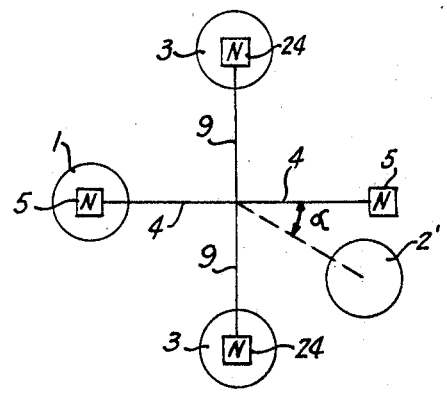
FIG. 7 shows another form of the invention.

The same action will also be produced in the oscillation according to FIG. 7, wherein the control coil 1 and the current coil 3 are respectively swung over from the peranent magnets 5 and 24, so that the current impulses through the coil 3 this time drive the rotor half 9, while the current coil 2' which simultaneously is energized by the current is situated from the permanent magnet 5 by an angular distance α. In this case the disturbing moment now acts on the rotor half 4 which simultaneously produces induced voltage while the drive moment acts on the rotor half 9.

FIGS. 3 to 6 show an especially compact arrangement of the elements of the invention wherein the two rotor halves 4' and 9' are nested in one another and the coils 1, 2 and 3 as well as the magnets 5 and 24 are almost in the same plane. The two rotor halves 4' and 9' are resiliently connected to each other by a helical spring 6' having attachment ends 8' and 7'. The arbor 10 carrying a work train drive pinion 11 is rigidly connected to the rotor half 9'.

As shown in FIG. 3 the arbor 10 is again bearingly mounted at one end of the framework at 13 and at the other in a bearing 16 in the rotor half 4'. The lie of the bearing 16 is, for its part, determined by a pivot cone plug 12 in the framework. Preferably the bearing 16 is at the center of gravity of the rotor half 4'.

Figure 4:
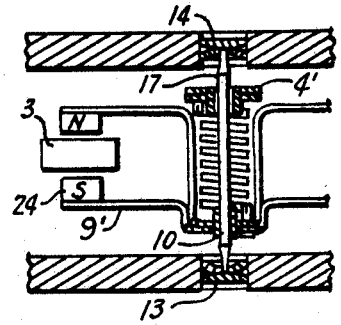

Another bearing arrangement is shown in FIG. 4 wherein the arbor 10 connected to the rotor half 9' is again bearingly mounted on the framework at 13 and is also mounted therein at 14. The rotor half 4' is, for its part, bearingly mounted on the arbor 10 by a bearing 17.

In the arrangements of FIGS. 3 to 6 again the rotor half 4' serves for control and drive while the rotor 9' provides the disturbing moment, while upon a turning of about 90° control and drive are effected by the rotor half 9' whereas the disturbing moment operates on the rotor half 4'. It is also possible that the coil arrangement corresponding to FIG. 7 be used. The modifications according to FIGS. 3 to 6 have almost the very minimum thickness which is a great advantage for a construction having a relatively large drive moment.

Figure 2:
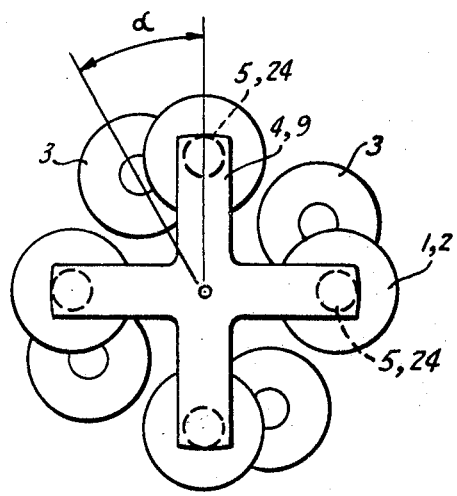
FIG. 2 shows the invention of FIG. 1 in plan.
Figure 3:
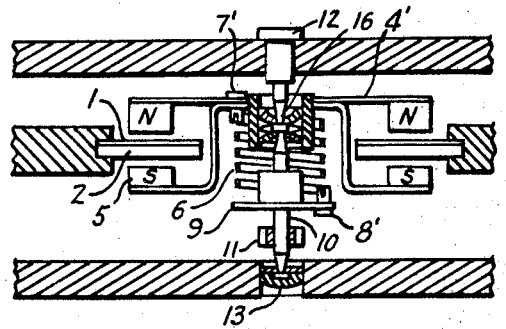
FIGS. 3 and 4 are side views of another form of the invention with the rotor halves terminating in nearly the same plane.
Figure 5:
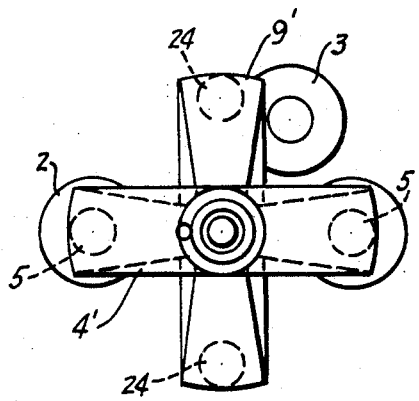
FIG. 5 shows a plan of the invention according to FIGS. 3 and 4.
Figure 6:
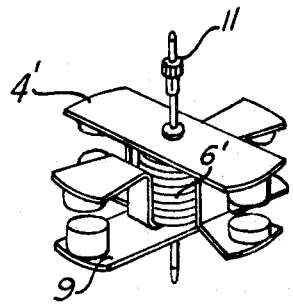
FIG. 6 shows the invention of FIGS. 3 to 5 in perspective.
Figure 8:
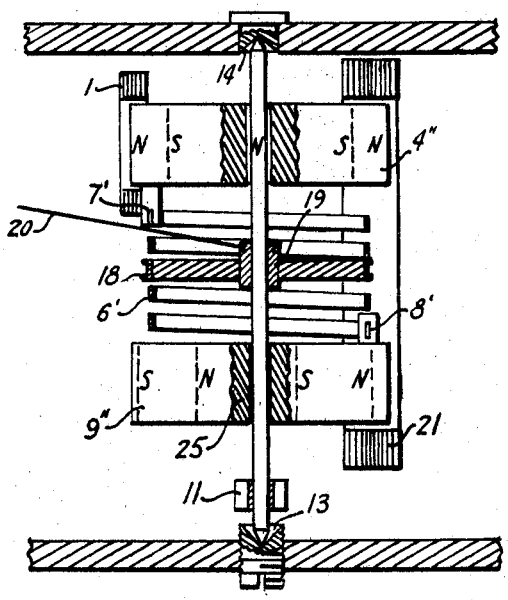
FIG. 8 shows a form of the invention having only one current coil.
Figure 9:
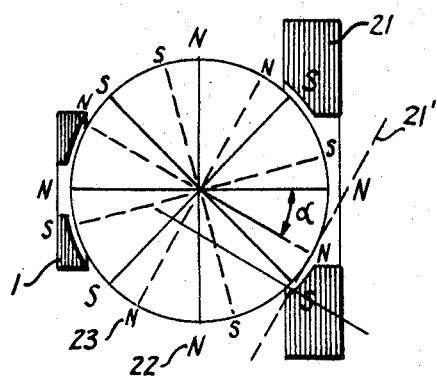
FIG. 9 is a plan of the invention according to FIG. 8.

A further preferred embodiment of the invention is shown in FIGS. 8 and 9 wherein only a single current coil 21 is used and it cooperates with both rotor halves 4" and 9". Correspondingly the control coil 1 cooperates with only the permanent magnets of one rotor half. The poles 22 and 23 respectively of rotor halves 4" and 9" are displaced from each other by an angle α. Both of coils 1 and 21 are located opposite one another in positions as shown in FIGS. 2 and 5. The coil 21 can however be turned through the angle α from this position and then occupy the position 21' whereby then the mode of action corresponds to that described of FIG. 7. Especially advantageous is the novel bearing arrangement wherein the arbor 25 bearingly mounted at 13 and 14 is connected to the mid portion of the helical spring 6' and thus at to the node of oscillation thereof. This connection to the mid portion is made through a disc 18. The tuning of the torsional oscillatory system to its correct frequency is made by a regulator arm 20 which is turnably mounted on a bushing 19 of the disc to vary the effective length of the spring 6'. The modification according to FIG. 8 has the great advantage that the tuning to the requisite frequency can be obtained while the oscillatory system is not running. The arbor 25 is thus held fast by means of the pinion 11 and the rotor half 4" set in oscillation which is then automatically maintained. During this oscillation, with the rotor 9" held still, the requisite frequency can be obtained by adjustment of the regulator.

It should be noted that the mounting of the ends of the springs 6 or 6' at their points of attachment 7 and 8 or 7' and 8' are so as to leave no tension on the springs when the rotors are in proper position with respect to each other. This can be done by means of clamps. The natural curve of the spring should not be distorted during the mounting.

Tests of the disclosed systems has shown they operate only at the nominal frequency and speed. This is due to prevention of harmonic speeds owing to the relatively very low natural frequency of the system and to the large coil and pole distances, each, as shown in FIGS. 1–9 being no less than 90° for like poles.

By proper timing of the switch S by the resistor capacitor R and C the motor is self starting and unidirectional. This is obtained when the fundamental frequency of the switching at S is somewhat below the natural frequency of the mechanical oscillation.

What is claimed is:

1. A speed controlled motor for an electrically driven timekeeping instrument comprising two coaxial rotor halves provided with permanent magnet poles and mounted for relative turning with respect to each other, a resilient element connecting the two halves and providing a strain-free relative position therefor, an air core inductor control coil fixed adjacent the path of the poles of at least one of the rotor halves whereby upon passage of the magnets thereof near the coil an induced voltage is produced therein, an electronic switch operated by the control coil and connected thereto, at least one fixed air core current coil and a source of current therefor with the switch interposed between the source and coil to produce current impulses therein, the current coil being adjacent said path, the position of the coils, when the rotor halves are in said strain-free position, being about the rotor halves so that when a voltage is induced in the control coil to produce an impulse in a current coil, a pole of one rotor half will be substantially opposite a current coil and a pole of the other rotor half will be displaced from a current coil by an angle, and a stiff rotary arbor carrying said rotor halves, and a work train drive pinion on the arbor and rigidly connected to one of the rotor halves.

2. A motor as claimed in claim 1, said angle being about 30°.

3. A motor as claimed in claim 1 wherein the rotor halves normally are in substantial registry and the current coils are more than one and angularly off-set from each other.

4. A motor as claimed in claim 1 the number of current coils being only one and the rotor halves are normally out of registry by said angle.

5. A motor as claimed in claim 1 wherein both rotor halves have the same number of poles, with each having at least 4 and are angularly spaced the same distance apart.

6. A motor as claimed in claim 5, the current coils being a plurality and in sets with one set cooperating with the poles of one rotor half and the other set with the other rotor half.

7. A motor as claimed in claim 5, said resilient element being a helical spring coaxial with the rotor halves.

8. A motor as claimed in claim 7 and means intermediate the two rotor halves for varying the effective length of the spring to vary the natural frequency of relative turning of the two halves.

9. A motor as claimed in claim 8, said means including a disc connected on the arbor and transverse thereto, the disc being connected to the midportion of the helical spring, and a regulator arm on the disc and turnable about teh axis of the arbor to engage on the spring to vary the effective length of at least a portion of the spring.

References Cited

UNITED STATES PATENTS

| | | | |
|---|---|---|---|
| 3,308,313 | 3/1967 | Favre | 310—36 |
| 3,356,919 | 12/1967 | Reich | 310—36 XR |
| 3,217,485 | 11/1965 | Musser et al. | 58—2 |
| 3,184,623 | 5/1965 | Maurti et al. | 310—36 |
| 2,986,683 | 5/1961 | Lavet et al. | 310—36 XR |
| 2,728,188 | 12/1955 | Hettich | 58—107 |
| 3,214,662 | 10/1965 | DeWolf | 318—138 |
| 3,192,488 | 6/1965 | Faith et al. | 318—138 XR |
| 2,594,749 | 4/1952 | Ehrat et al. | 310—25 XR |

FOREIGN PATENTS

| | | |
|---|---|---|
| 880,355 | 5/1950 | Germany. |
| 516,115 | 2/1955 | Italy. |

MILTON O. HIRSHFIELD, Primary Examiner

B. A. REYNOLDS, Assistant Examiner

U.S. Cl. X.R.

58—23, 26; 310—84; 318—129, 138, 254, 451